(12) United States Patent
Yoneda et al.

(10) Patent No.: US 10,805,700 B2
(45) Date of Patent: Oct. 13, 2020

(54) EXPANSION DEVICE HAVING A SPEAKER

(71) Applicant: LENOVO (SINGAPORE) PTE. LTD., Singapore (SG)

(72) Inventors: Masaharu Yoneda, Kanagawa (JP); Kazuo Fujii, Kanagawa (JP); Masayuki Amano, Kanagawa (JP)

(73) Assignee: LENOVO (SINGAPORE) PTE LTD, Singapore (SG)

(*) Notice: Subject to any disclaimer, the term of this patent is extended or adjusted under 35 U.S.C. 154(b) by 0 days.

(21) Appl. No.: 16/516,985

(22) Filed: Jul. 19, 2019

(65) Prior Publication Data

US 2020/0029141 A1 Jan. 23, 2020

(30) Foreign Application Priority Data

Jul. 19, 2018 (JP) .................................. 2018-135796
Sep. 25, 2018 (JP) .................................. 2018-178877

(51) Int. Cl.
 *H04R 1/02* (2006.01)
 *H04R 1/28* (2006.01)
 *H04R 1/32* (2006.01)
 *G06F 1/16* (2006.01)

(52) U.S. Cl.
 CPC ........... *H04R 1/028* (2013.01); *G06F 1/1688* (2013.01); *H04R 1/2803* (2013.01); *H04R 1/323* (2013.01)

(58) Field of Classification Search
 CPC ...... H04R 1/028; H04R 1/2803; H04R 1/323; G06F 1/1688

USPC ........................................... 381/99, 100, 334
See application file for complete search history.

(56) References Cited

U.S. PATENT DOCUMENTS

| | | | | |
|---|---|---|---|---|
| 5,604,663 | A | * | 2/1997 | Shin .................... G06F 1/1632 361/679.43 |
| 6,043,976 | A | | 3/2000 | Su |
| 6,148,243 | A | * | 11/2000 | Ishii ..................... H04S 1/002 700/94 |
| 6,148,353 | A | | 11/2000 | Cho |

(Continued)

FOREIGN PATENT DOCUMENTS

| | | |
|---|---|---|
| JP | 57-072688 U | 5/1982 |
| JP | 07-295939 | 10/1995 |

(Continued)

*Primary Examiner* — David L Ton
(74) *Attorney, Agent, or Firm* — Russell Ng PLLC; Antony P. Ng

(57) ABSTRACT

An electronic apparatus appropriately outputs low-frequency sound to high-frequency sound to enable acoustic reproduction with high sound quality is disclosed. A portable information apparatus includes a first speaker; and an expansion device includes a second speaker. The portable information apparatus includes a mode switching unit for selecting a single mode or a combined mode; and an acoustic adjustment unit for adjusting acoustic data output to the first speaker and/or the second speaker. During the single mode, the acoustic adjustment unit outputs the acoustic data to the first speaker. During the combined mode, the acoustic adjustment unit extracts high-frequency sound from the acoustic data and outputs the high-frequency sound to the first speaker, and extracts low-frequency sound from the acoustic data and outputs the low-frequency sound to the second speaker.

16 Claims, 11 Drawing Sheets

(56) References Cited

U.S. PATENT DOCUMENTS

| | | | | |
|---|---|---|---|---|
| 6,359,994 B1* | 3/2002 | Markow | ............... | G06F 1/1616 |
| | | | | 361/679.41 |
| 6,813,528 B1* | 11/2004 | Yang | ..................... | G06F 1/1632 |
| | | | | 381/306 |
| 6,983,053 B2* | 1/2006 | Lee | ........................ | H04R 3/04 |
| | | | | 381/123 |
| 7,545,946 B2* | 6/2009 | Melanson | ................ | H04R 3/12 |
| | | | | 381/307 |
| 8,121,329 B2* | 2/2012 | Groset | ..................... | H04R 5/02 |
| | | | | 381/333 |
| 2008/0273734 A1* | 11/2008 | Solland | .................... | H04R 1/02 |
| | | | | 381/334 |
| 2010/0202647 A1* | 8/2010 | Kuan | ................... | H04S 1/002 |
| | | | | 381/334 |
| 2013/0259283 A1* | 10/2013 | Gengler | .................. | H04R 1/00 |
| | | | | 381/334 |
| 2014/0079267 A1* | 3/2014 | Lyons | .................... | H04R 1/026 |
| | | | | 381/334 |

FOREIGN PATENT DOCUMENTS

| | | |
|---|---|---|
| JP | 09-274557 A | 10/1997 |
| JP | 2006-054524 A | 2/2006 |
| JP | 2008-085645 A | 4/2008 |
| JP | 2008-299630 | 12/2008 |
| JP | 2009-100317 | 5/2009 |
| JP | 2014170380 A | 9/2014 |
| JP | 2005-039081 | 2/2015 |
| JP | 2015-038656 | 2/2015 |

\* cited by examiner

EXPANSION DEVICE HAVING A SPEAKER

PRIORITY CLAIM

The present application claims benefit of priority under 35 U.S.C. §§ 120, 365 to the previously filed Japanese Patent Application No. JP2018-135796 with a priority date of Jul. 19, 2018, and the previously filed Japanese Patent Application No. JP2018-178877 with a priority date of Sep. 25, 2019, which are incorporated by reference herein.

TECHNICAL FIELD

The present invention relates to portable information apparatuses in general, and in particular to a portable information apparatus having a first speaker, and an expansion device having a second speaker.

BACKGROUND

With rapid thickness reduction of chassis of portable information apparatuses such as laptop PCs, the functions of portable information apparatuses are often limited. For such portable information apparatuses, expansion devices as dedicated devices for expanding functions are provided.

A speaker installed in such a portable information apparatus is placed at a position that allows a user to hear sound as easily as possible. However, as a result of thickness reduction of chassis of portable information apparatuses, installed speakers are also reduced in thickness or size and thus are limited in sound quality and range. In particular, the output characteristics of low frequency sound are insufficient.

Some users use external speakers of large sizes. Even when such an external speaker is used; however, high frequency sound with high directivity may not appropriately reach a listener due to placement constraint caused by the large size, and it is often troublesome to set the external speaker in an appropriate direction based on directivity.

Consequently, it would be desirable to provide an electronic apparatus that appropriately outputs low frequency sound to high frequency sound to enable acoustic reproduction with high sound quality.

SUMMARY

In accordance with an embodiment of the present disclosure, an expansion device includes a second speaker to be combined with a portable information apparatus having a first speaker. The portable information apparatus includes a mode switching unit for selecting a single mode or a combined mode, which is related to whether the first speaker and/or the second speaker should be driven; and an acoustic adjustment unit for adjusting acoustic data output to the first speaker and/or the second speaker, depending on the mode selected by the mode switching unit. When the mode switching unit selects the single mode, the acoustic adjustment unit is configured to output the acoustic data to the first speaker, and when the mode switching unit selects the combined mode, the acoustic adjustment unit is configured to extract high-frequency sound from the acoustic data and outputs the high-frequency sound to the first speaker, and to extract low-frequency sound from the acoustic data and outputs the low-frequency sound to the second speaker.

The expansion device may be removably attachable to the portable information apparatus. The mode switching unit may be configured to select the single mode when the expansion device is not attached, and to select the combined mode when the expansion device is attached. Thus, automatic switching between the single mode and the combined mode is performed in response to the attachment and removal of the expansion device.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
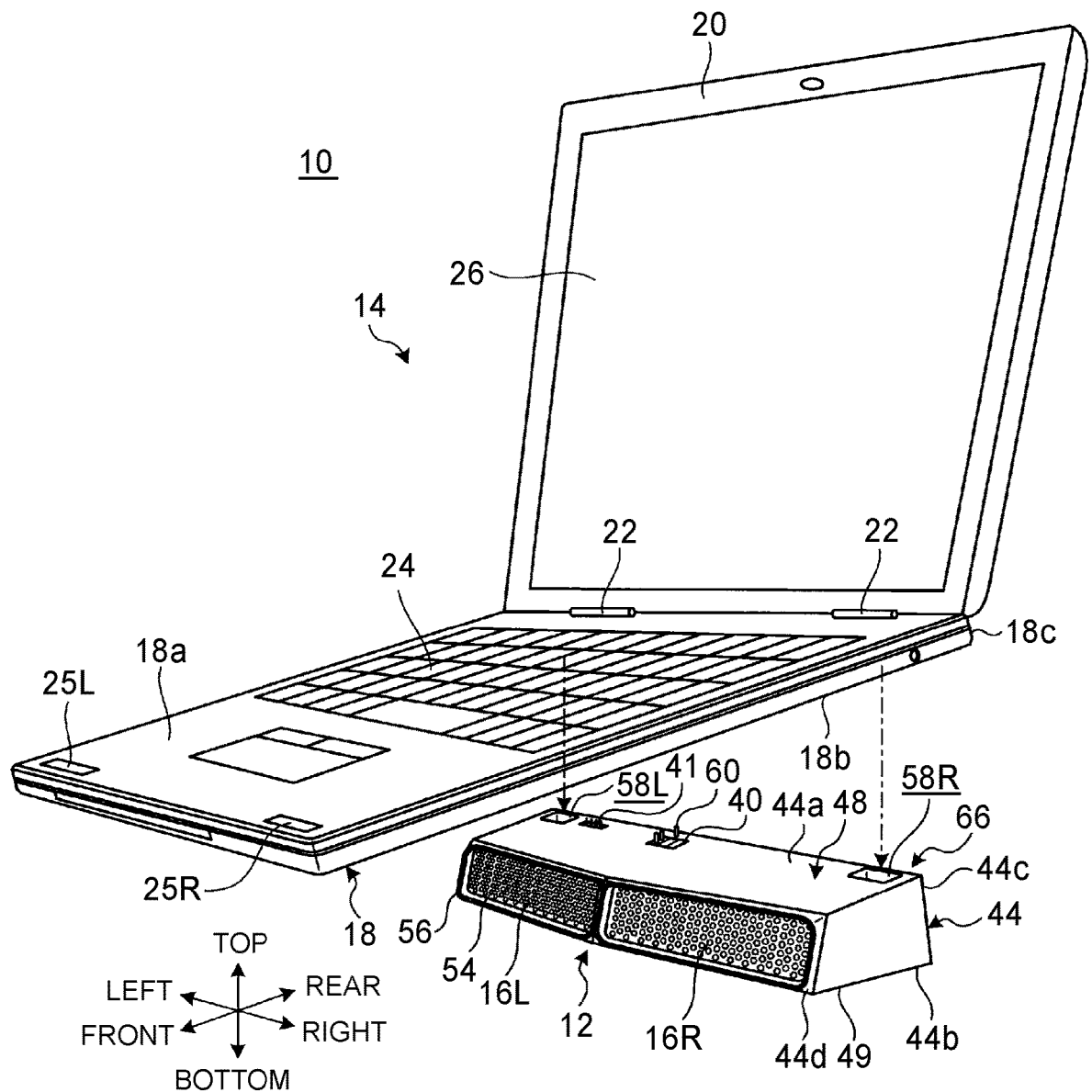
FIG. 1 is an exploded perspective view illustrating the operation of attaching an expansion device to a portable information apparatus, according to one embodiment.
Figure 2A:
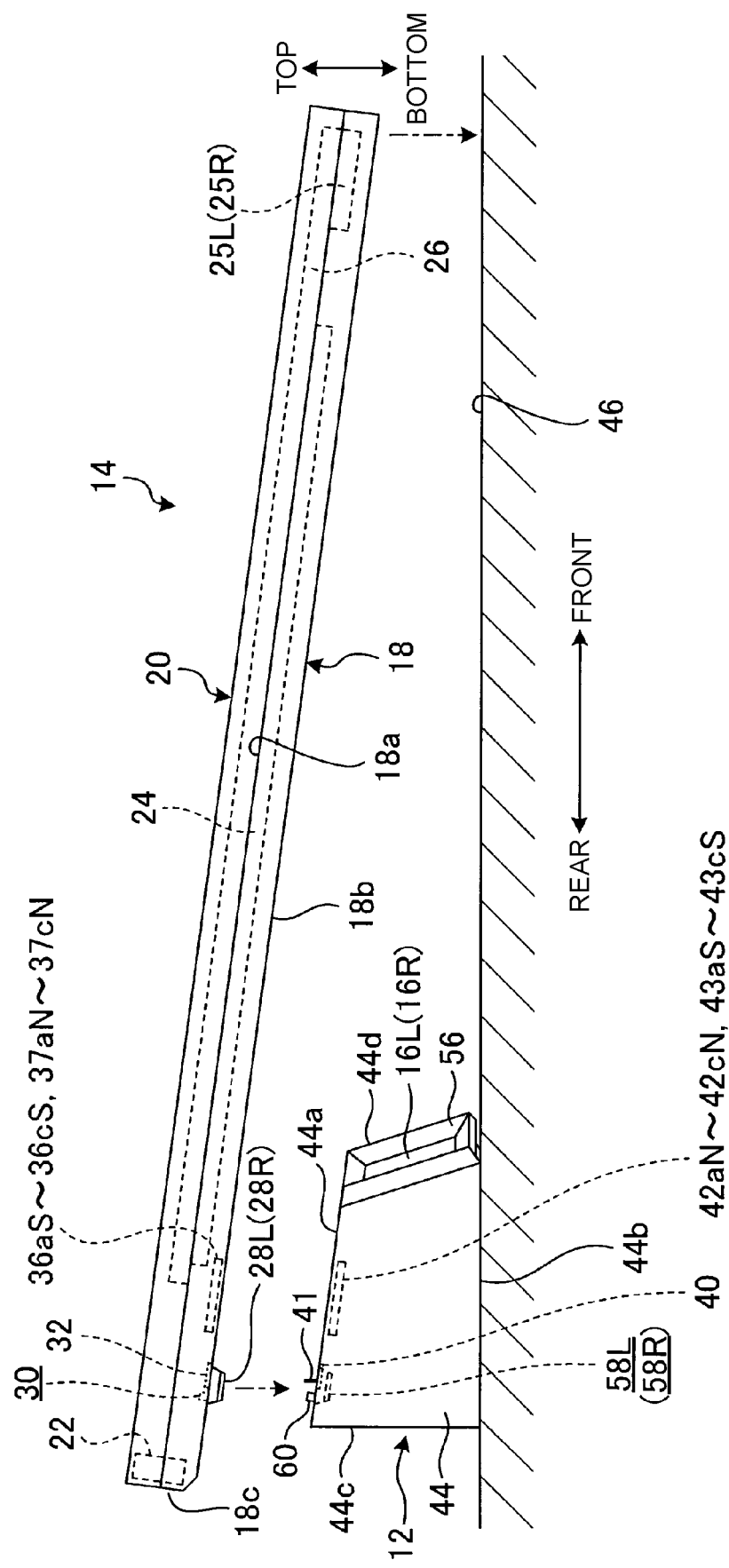
FIG. 2A is a side view illustrating the operation of attaching the expansion device to the portable information apparatus.
Figure 2B:
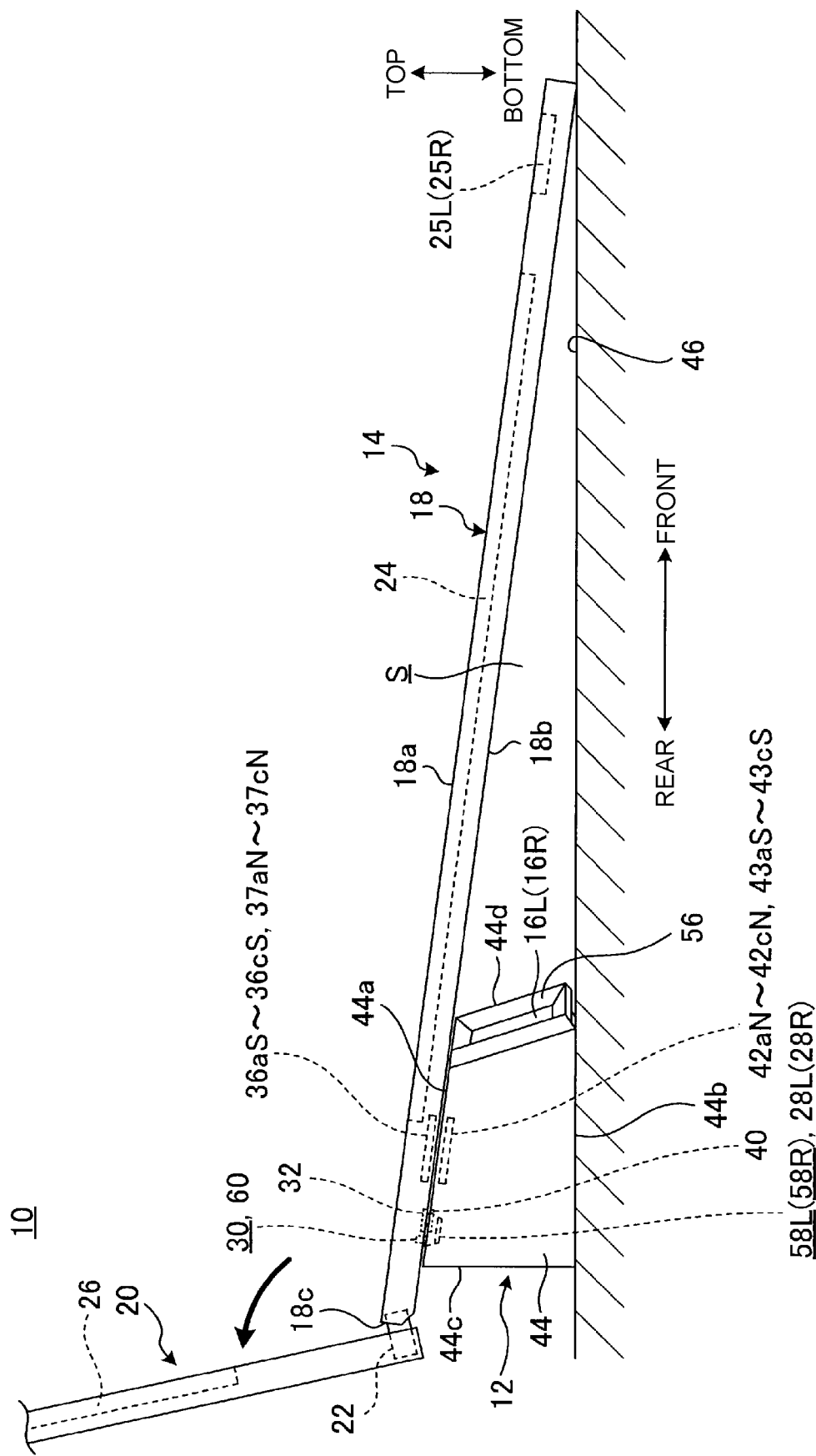
FIG. 2B is a side view of the electronic apparatus in which the expansion device is attached to the portable information apparatus.

FIG. 1 is an exploded perspective view illustrating the operation of attaching an expansion device 12 to a portable information apparatus 14 in an electronic apparatus 10, according to one embodiment. FIG. 2A is a side view illustrating the operation of attaching the expansion device 12 to the portable information apparatus 14. FIG. 2B is a side view of the electronic apparatus 10 in which the expansion device 12 is attached to the portable information apparatus 14.

The electronic apparatus 10 has the expansion device 12 removably attached to the portable information apparatus 14 such as a laptop PC. The expansion device 12 includes a pair of left and right speakers (second speaker) 16L and 16R, to improve the speaker function of the portable information apparatus 14. The portable information apparatus 14 may be used for function expansion of a portable information apparatus other than a clamshell laptop PC, such as a tablet PC.

Hereafter, based on the direction in which the user uses the portable information apparatus 14 as a laptop PC to which the expansion device 12 is attached, the front side is referred to as "front," the rear side as "rear," the thickness direction of the expansion device 12 as "top-bottom," and the width direction of the expansion device 12 as "left-right," as illustrated in FIG. 2B.

As illustrated in FIGS. 1 to 2B, the portable information apparatus 14 has a structure in which an apparatus chassis 18 and a display chassis 20 are rotatably coupled by a hinge 22. The apparatus chassis 18 is a chassis formed in a thin rectangular box shape. A keyboard 24 and a pair of left and right internal speakers (first speaker) 25L and 25R are provided at a top surface 18a of the apparatus chassis 18, and the expansion device 12 is attached to and removed from a bottom surface 18b of the apparatus chassis 18.

The internal speakers 25L and 25R are small, and are provided near the left and right ends at the front of the top surface 18a. The internal speakers 25L and 25R are located at the front, and there is no obstacle that hinders sound transmission. Thus, the internal speakers 25L and 25R are located at a position that allows the user to hear sound easily. The internal speakers 25L and 25R are also adequately separated to left and right, and are suitable for stereophonic sound reproduction. Meanwhile, since the internal speakers 25L and 25R are small, their output characteristics of low frequency sound are not necessarily sufficient.

The display chassis 20 is a chassis formed in a thin rectangular box shape, and has a display 26 in a main part of its front surface. The hinge 22 couples the bottom end of the display chassis 20 to the rear end of the apparatus chassis 18. The hinge 22 in this embodiment has a structure of projecting rearward from the rear surface 18c of the apparatus chassis 18 when the display chassis 20 is opened (see the hinge 22 indicated by chain double-dashed lines in FIG. 2B), i.e., a drop-down structure. The hinge 22 may have a structure other than a drop-down structure. The portable information apparatus 14 may have, for example, a structure in which the display chassis 20 is a tablet PC, the apparatus chassis 18 is the keyboard 24, and the display chassis 20 and the apparatus chassis 18 are removably attachable to each other.

Figure 3:
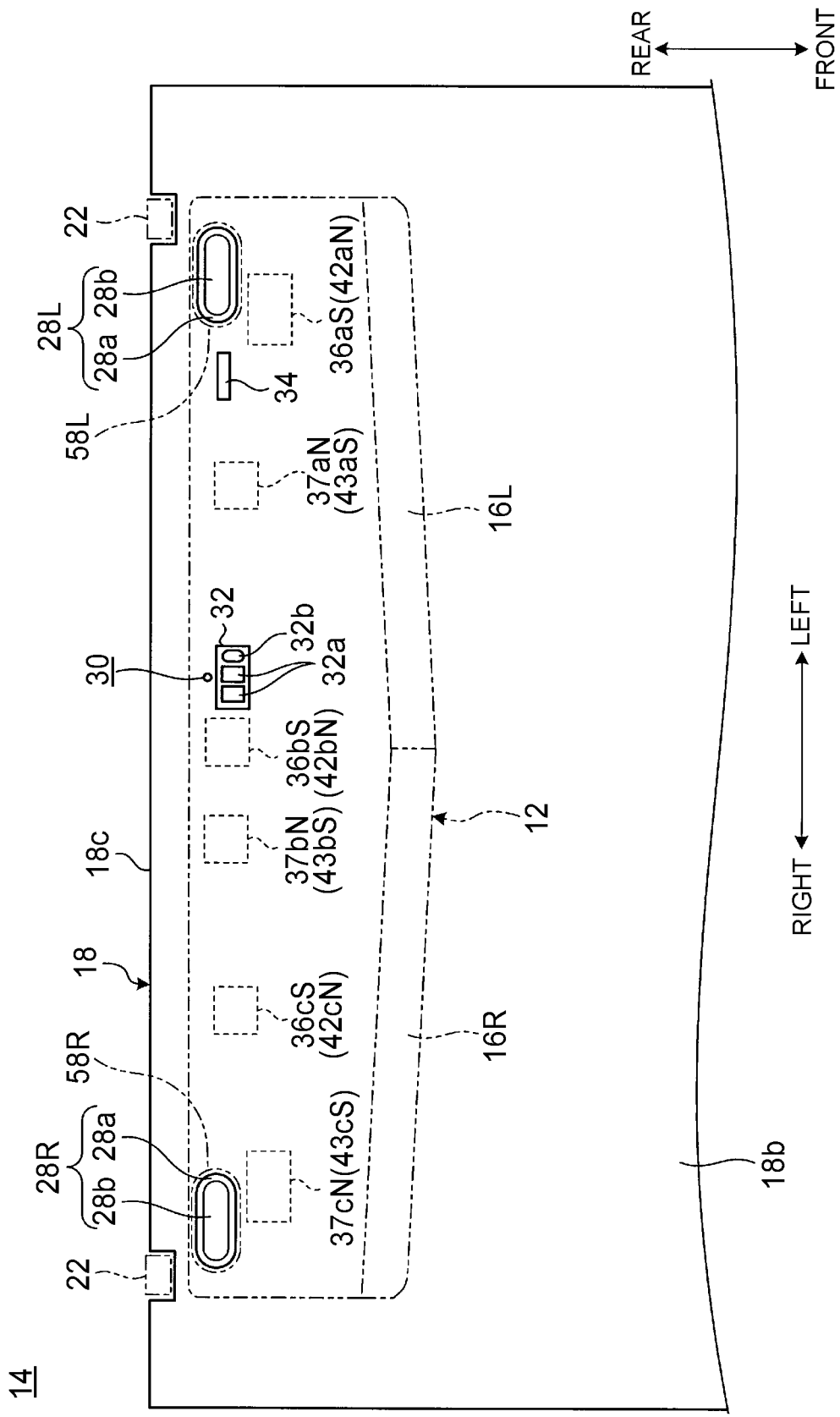
FIG. 3 is an enlarged bottom view illustrating an example of the structure of a bottom surface of an apparatus chassis of the portable information apparatus.

As illustrated in FIGS. 2A to 3, a pair of left and right leg portions 28L and 28R, a positioning hole 30, a connected portion 32, and a terminal plate 34 are provided at the bottom surface 18b of the apparatus chassis 18. Further, the apparatus chassis 18 is provided with a plurality of magnets 36aS, 36bS, 36cS, 37aN, 37bN, and 37cN so as to face the bottom surface 18b.

The leg portions 28L and 28R are provided respectively at the left and right of the rear part of the bottom surface 18b, and protrude downward from the bottom surface 18b. The leg portions 28L and 28R are each in an oblong domical shape with its longitudinal direction corresponding to the left-right direction. That is, the leg portions 28L and 28R each have a tapered shape that decreases in diameter so that the cross-sectional area in the horizontal direction gradually decreases from the bottom surface 18b to the top surface. The leg portions 28L and 28R are not limited to an oblong domical shape, and may have any of various shapes such as a circular domical shape, a rectangular domical shape, and a rectangular parallelepiped shape. In this embodiment, the leg portions 28L and 28R are each composed of a pedestal-like base 28a fixed to the bottom surface 18b and a rubber-made contact portion 28b fixed to the surface of the base 28a. That is, the leg portions 28L and 28R are rubber legs.

The positioning hole 30 is a small-diameter hole formed at the left-right substantial center on the rear end side of the bottom surface 18b. The positioning hole 30 is formed in a resin or metal plate which is a chassis member forming the bottom surface 18b of the apparatus chassis 18. The positioning hole 30 is located near the rear side of the connected portion 32.

The connected portion 32 is located on the front side of the positioning hole 30, at the left-right substantial center on the rear end side of the bottom surface 18b. The connected portion 32 is buried in the apparatus chassis 18, and has its surface exposed to the bottom surface 18b. The connected portion 32 is a communication portion electrically connected to the below-described connection portion 40 of the expansion device 12 (see FIG. 5A). The connected portion 32 has an optical communication module 32a which is non-contact type electric connection means, and a terminal board 32b which is contact type electric connection means. For example, the connected portion 32 may be composed of only one of the optical communication module 32a and the terminal board 32b. The connected portion 32 may be omitted.

The terminal plate 34 is located on the right side of the left leg portion 28L. The terminal plate 34 is a metal plate that comes into contact with the below-described spring pin 41 (see FIG. 5A) of the expansion device 12 to be electrically connected to it. In this embodiment, sound output such as voice or music from the portable information apparatus 14 is transmitted from the terminal plate 34 through the spring pin 41 to the expansion device 12, and reproduced by the speakers 16L and 16R.

The magnets 36aS to 36cS and 37aN to 37cN are each a magnet that is located at the bottom inside the apparatus chassis 18 so as to face the bottom surface 18b, and thus can generate a magnetic force through the bottom surface 18b of the apparatus chassis 18. The magnets 36aS to 36cS and 37aN to 37cN are provided along the left-right direction, at a position overlapping the attachment position of the expansion device 12 to the bottom surface 18b (see the expansion device 12 indicated by chain double-dashed lines in FIG. 3). When the expansion device 12 is positioned to the bottom surface 18b, the magnets 36aS to 36cS and 37aN to 37cN can attract respectively the below-described plurality of magnets 42aN, 42bN, 42cN, 43aS, 43bS, and 43cS of the expansion device 12 (see FIG. 5A).

As illustrated in FIGS. 1 to 2B, the expansion device 12 includes the device chassis 44 and the pair of left and right speakers 16L and 16R mounted in the device chassis 44. The device chassis 44 is a chassis formed in a prismatic shape extending in the left-right direction. The top surface 44a of the device chassis 44 is an attachment surface to the bottom surface 18b of the apparatus chassis 18 of the portable information apparatus 14, and the bottom surface 44b of the device chassis 44 is a land surface to a use surface 46 such as the top plate of a desk.

The device chassis 44 has a front-part-low inclined shape in which the thickness between the top surface 44a and the bottom surface 44b gradually decreases in the direction from the rear surface 44c to the front surface 44d, i.e., the direction from the rear to the front (see FIGS. 2A and 2B). In this embodiment, the bottom surface 44b is a horizontal surface orthogonal to the rear surface 44c, and the top surface 44a is a front-part-low inclined surface. The device chassis 44 has a shorter front-rear dimension than the front-rear dimension of the apparatus chassis 18, and is attached to the rear end side of the bottom surface 18b of the apparatus chassis 18. Thus, the electronic apparatus 10 is provided in a front-part-low inclined posture on the use surface 46, with the bottom surface 44b of the expansion device 12 being a land surface on the rear end side to the use surface 46 and the front end of the bottom surface 18b of the apparatus chassis 18 of the portable information apparatus 14 being a land surface on the front end side to the use surface 46 (see FIG. 2B). This enables the keyboard 24 mounted on the top surface 18a of the apparatus chassis 18 to be in an appropriate front-part-low inclined posture. Hence, the operability is improved, and a space S for allowing sound from the speakers 16L and 16R to pass through is secured in front of the expansion device 12. Further, the expansion device 12 fits into the space under the apparatus chassis 18, thus saving space. For example, rubber legs similar to the leg portions 28L and 28R may be provided at the bottom surface 44b.

Figure 4:
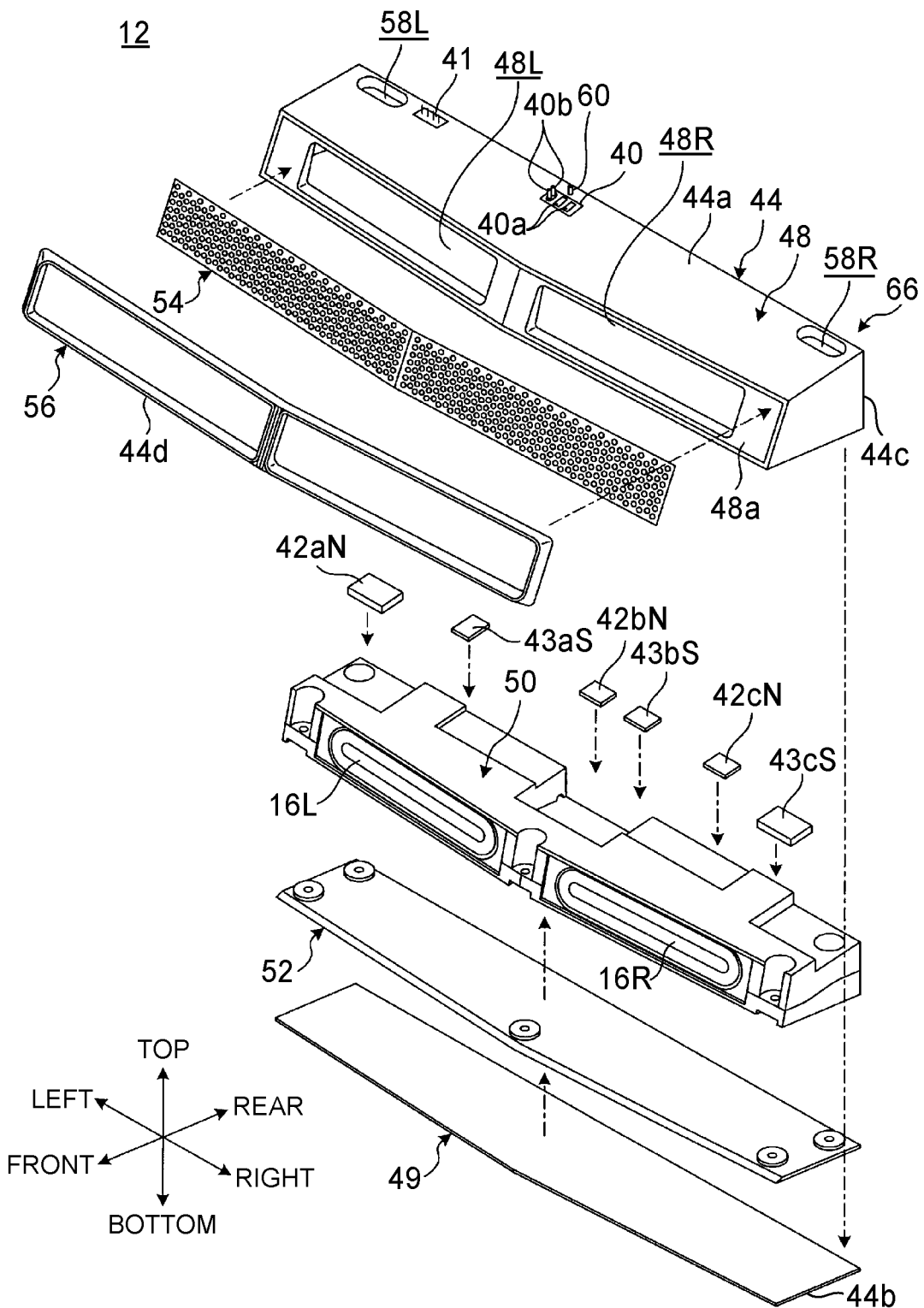
FIG. 4 is an exploded perspective view of the expansion device.

FIG. 4 is an exploded perspective view of the expansion device 12.

As illustrated in FIGS. 1 and 4, the device chassis 44 has a structure in which a bottom surface opening of a top cover 48 open downward is closed by a base plate 49. The speakers 16L and 16R are mounted in a common speaker box 50. The speaker box 50 containing the speakers 16L and 16R is provided in the top cover 48, and has its bottom surface side supported by a support plate 52 held on the inner surface side of the base plate 49.

A front surface 48a of the top cover 48 is approximately V-shaped in planar view, with the left half facing to the left of the front and the right half facing to the right of the front. The left and right speakers 16L and 16R face left and right openings 48L and 48R formed at the front surface 48a. Hence, the left speaker 16L is installed in a direction inclined to the left from the front at the front surface 44d, and the right speaker 16R is installed in a direction inclined to the right from the front at the front surface 44d (also see FIG. 5A). A frame 56 is attached to the front surface 48a of the top cover 48 through a mesh plate 54 covering the openings 48L and 48R. As illustrated in FIGS. 1 to 2B, the thickness of the device chassis 44 in the top-bottom direction is considerably greater than the thickness of the apparatus chassis 18 of the portable information apparatus 14. Hence, the speakers 16L and 16R mounted in the expansion device 12 are particularly excellent in the output characteristics of the low range as compared with the internal speakers 25L and 25R of the portable information apparatus 14.

Figure 5A:
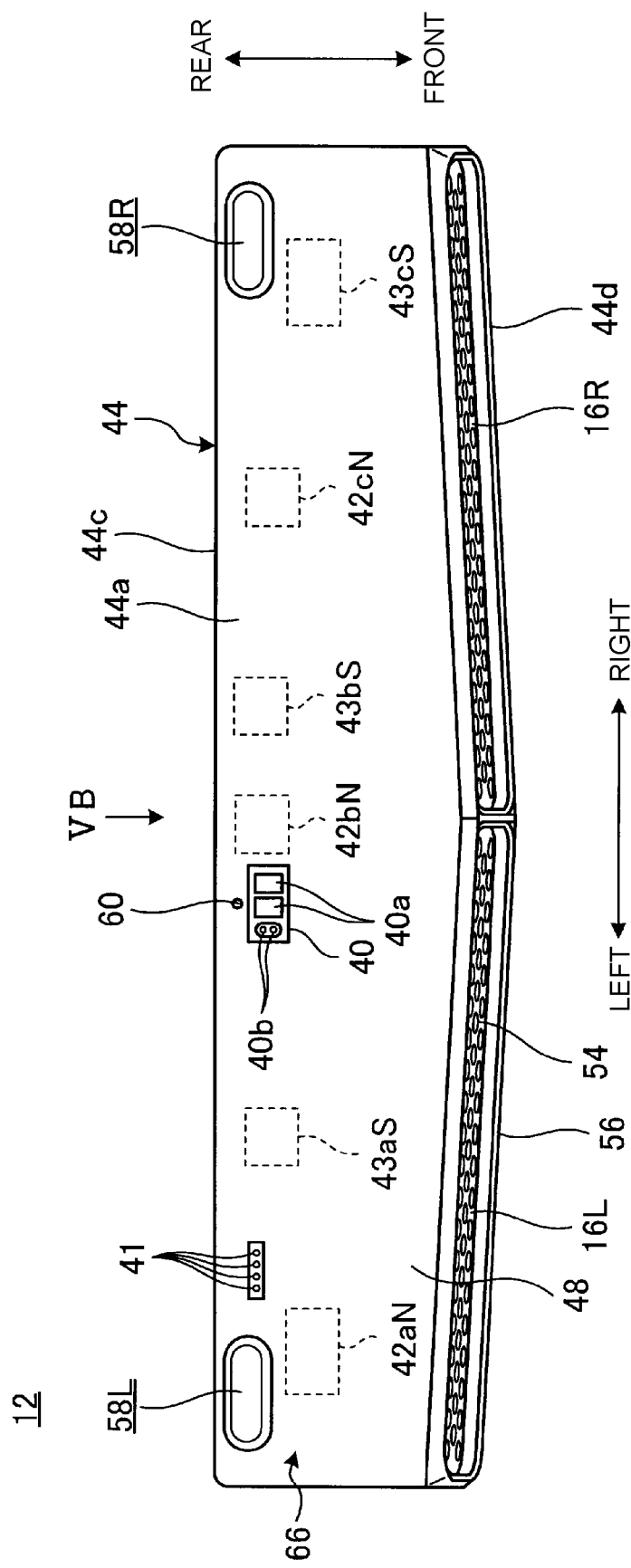
FIG. 5A is a plan view of the expansion device.
Figure 5B:
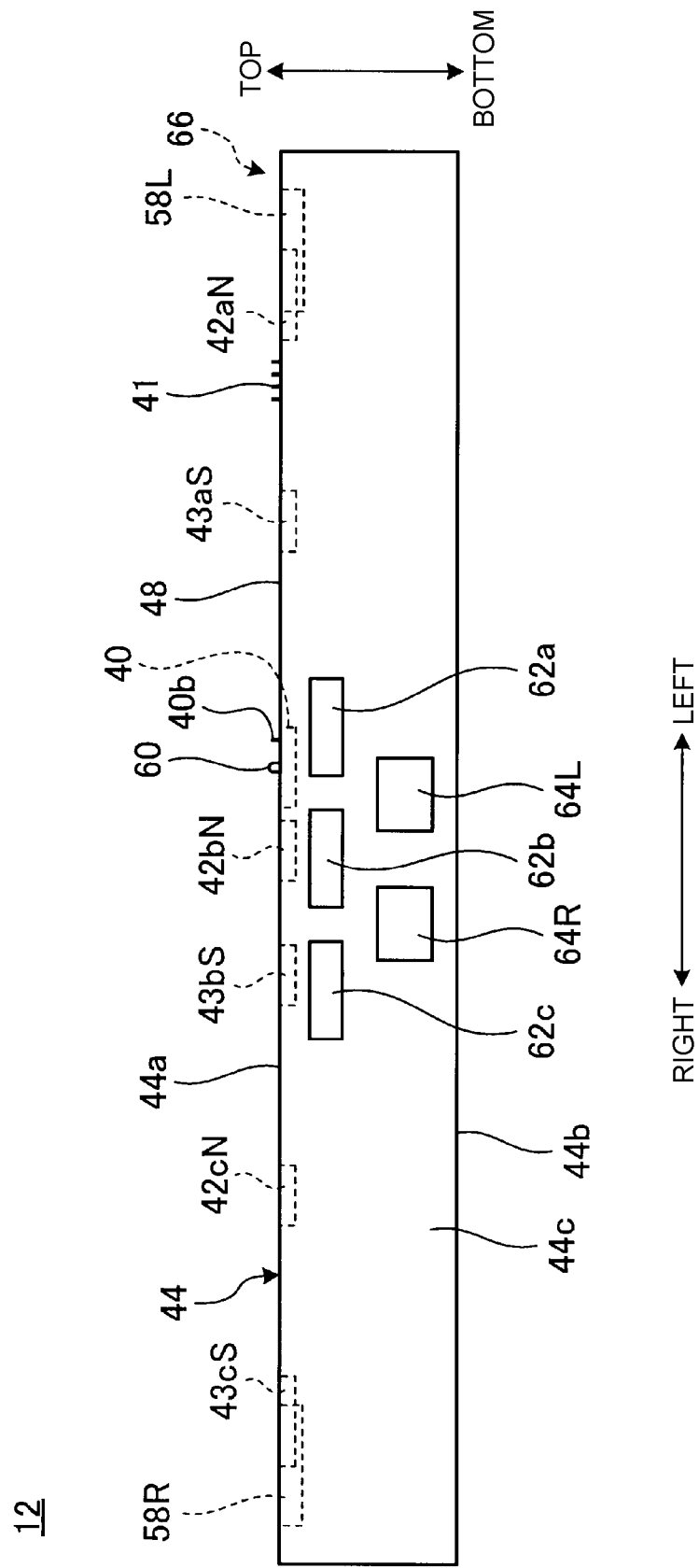
FIG. 5B is a back view of the expansion device.

FIG. 5A is a plan view of the expansion device 12. FIG. 5B is a back view of the expansion device 12 as seen in the direction of arrow VB in FIG. 5A.

As illustrated in FIGS. 4 to 5B, a pair of left and right fitting holes 58L and 58R, a positioning pin 60, a connection portion 40, and a plurality of spring pins 41 are provided at the top surface 44a of the device chassis 44. Further, the device chassis 44 is provided with a plurality of magnets 42aN to 42cN and 43aS to 43cS so as to face the top surface 44a. A plurality of connection terminals 62a, 62b, and 62c and a pair of left and right bass reflex ports 64L and 64R are provided at the rear surface 44c of the device chassis 44.

The fitting holes 58L and 58R are recessed portions provided respectively at the left and right of the rear part of the top surface 44a. The fitting holes 58L and 58R are each in an oblong bathtub shape with its longitudinal direction corresponding to the left-right direction. That is, the fitting holes 58L and 58R each have a tapered shape that decreases in diameter so that the cross-sectional area in the horizontal direction gradually decreases from the top surface 44a to the bottom surface. The fitting holes 58L and 58R are holes into which the leg portions 28L and 28R of the portable information apparatus 14 are fitted. Therefore, the fitting holes 58L and 58R are shaped according to the shape of the leg portions 28L and 28R so that the leg portions 28L and 28R can be fitted into the fitting holes 58L and 58R with a predetermined tolerance. As a result of the leg portions 28L and 28R being fitted into the fitting holes 58L and 58R, the expansion device 12 is positioned in the front-rear and left-right directions at a predetermined position with respect to the bottom surface 18b of the portable information apparatus 14, and also the expansion device 12 is prevented from rotating in the horizontal direction.

The positioning pin 60 is a small-diameter pin protruding upward from the left-right substantial center of the rear end side of the top surface 44a, and is made of, for example, metal. The positioning pin 60 can be fitted into the positioning hole 30 of the bottom surface 18b of the portable information apparatus 14. As a result of the positioning pin 60 being fitted into the positioning hole 30, the expansion device 12 is positioned in the front-rear and left-right directions at a predetermined position with respect to the bottom surface 18b of the portable information apparatus 14 more accurately. The positioning pin 60 may be omitted.

The connection portion 40 is located on the front side of the positioning pin 60, at the left-right substantial center on the rear end side of the top surface 44a. The connection portion 40 is buried in the device chassis 44, and has its surface exposed to the top surface 44a. The connection portion 40 is a communication portion electrically connected to the connected portion 32 provided at the bottom surface 18b of the portable information apparatus 14. The connection portion 40 has an optical communication module 40a which is non-contact type electric connection means, and a terminal pin 40b which is contact type electric connection means. The optical communication module 40a faces the optical communication module 32a of the portable information apparatus 14. For example, a pair of front and rear terminal pins 40b are provided as elastic advancing/retreating metal pins that come into contact with the terminal board 32b of the portable information apparatus 14. The two terminal pins 40b are, for example, a power pin and a ground pin. The connection portion 40 may be composed of only one of the optical communication module 40a and the terminal pin 40b, and may be omitted, as with the above-described connected portion 32.

The spring pins 41 are located on the right side of the left fitting hole 58L. The spring pins 41 are, for example, four left and right elastic advancing/retreating metal pins aligned. The spring pins 41 come into contact with the terminal plate 34 of the bottom surface 18b of the portable information apparatus 14 and are electrically connected to it. The spring pins 41 serve as a reception unit for sound output such as voice or music from the portable information apparatus 14, as mentioned above. In the electronic apparatus 10, for example, the connection system by the spring pins 41 and the terminal plate 34 may be replaced with a wireless connection system to transmit sound output from the portable information apparatus 14 to the expansion device 12.

The magnets 42aN to 42cN and 43aS to 43cS are each a magnet that is located at the top inside the device chassis 44 so as to face the top surface 44a, and thus can generate a magnetic force through the top surface 44a of the device chassis 44. Here, the magnets 42aN to 42cN have N-pole facing the top surface 44a, and the magnets 43aS to 43cS have S-pole facing the top surface 44a. Likewise, in the portable information apparatus 14, the magnets 36aS to 36cS have S-pole facing the bottom surface 18b, and the magnets 37aN to 37cN have N-pole facing the bottom surface 18b.

The magnets 42aN to 42cN and 43aS to 43cS are located to respectively face the magnets 36aS to 36cS and 37aN to 37cN provided at the bottom surface 18b of the portable information apparatus 14. Specifically, the magnet 42aN faces the magnet 36aS, the magnet 42bN faces the magnet 36bS, and the magnet 42cN faces the magnet 36cS. The magnet 43aS faces the magnet 37aN, the magnet 43bS faces the magnet 37bN, and the magnet 43cS faces the magnet 37cN. This generates an attraction force between the magnets 42aN to 42cN and 43aS to 43cS and the magnets 36aS to 36cS and 37aN to 37cN, as a result of which the top surface 44a of the expansion device 12 is removably attached to the bottom surface 18b of the portable information apparatus 14. In this embodiment, the magnets 42aN to 42cN and 43aS to 43cS have N-pole and S-pole alternating in the arrangement direction. This causes a certain degree of positioning action between the magnets 42aN to 42cN and 43aS to 43cS and the magnets 36aS to 36cS and 37aN to 37cN.

Thus, the fitting holes 58L and 58R, the magnets 42aN to 42cN and 43aS to 43cS, and the positioning pin 60 constitute a positioning attachment portion 66 that positions the expansion device 12 with respect to the bottom surface 18b of the portable information apparatus 14 and removably attaches the expansion device 12 to the bottom surface 18b of the portable information apparatus 14.

The connection terminals 62a to 62c are, for example, terminals conforming to the Universal Serial Bus (USB) standard or any of other various standards. For example, the connection terminals 62a to 62c are capable of connecting an external apparatus (not illustrated) such as an external storage device or a monitor device. The external apparatus connected to the connection terminals 62a to 62c is electrically connected to the portable information apparatus 14 via the connection portion 40 and the connected portion 32, to be operable on the portable information apparatus 14 side. The connection terminals 62a to 62c may be omitted.

Figure 6A:
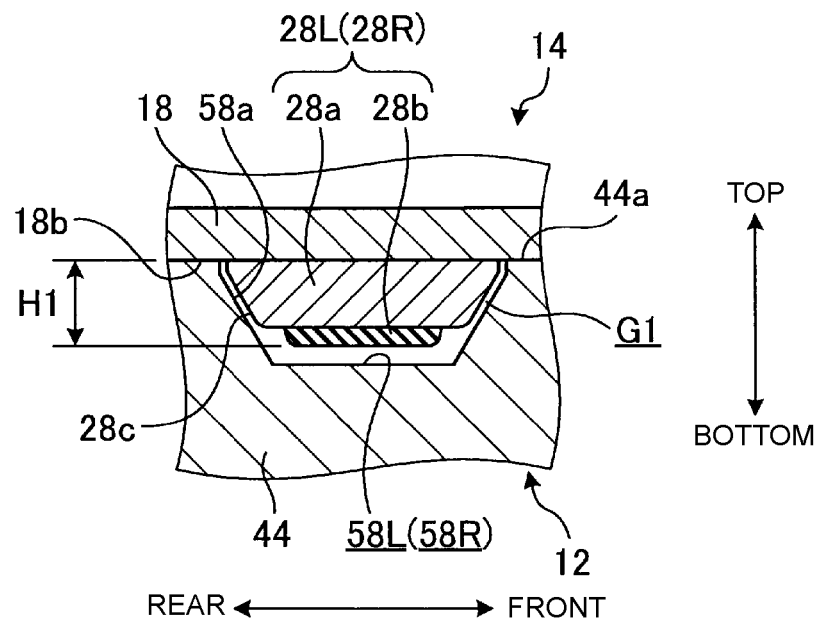
FIG. 6A is a sectional side view of a leg portion and a fitting hole in a fitting state taken along their lateral directions.
Figure 6B:
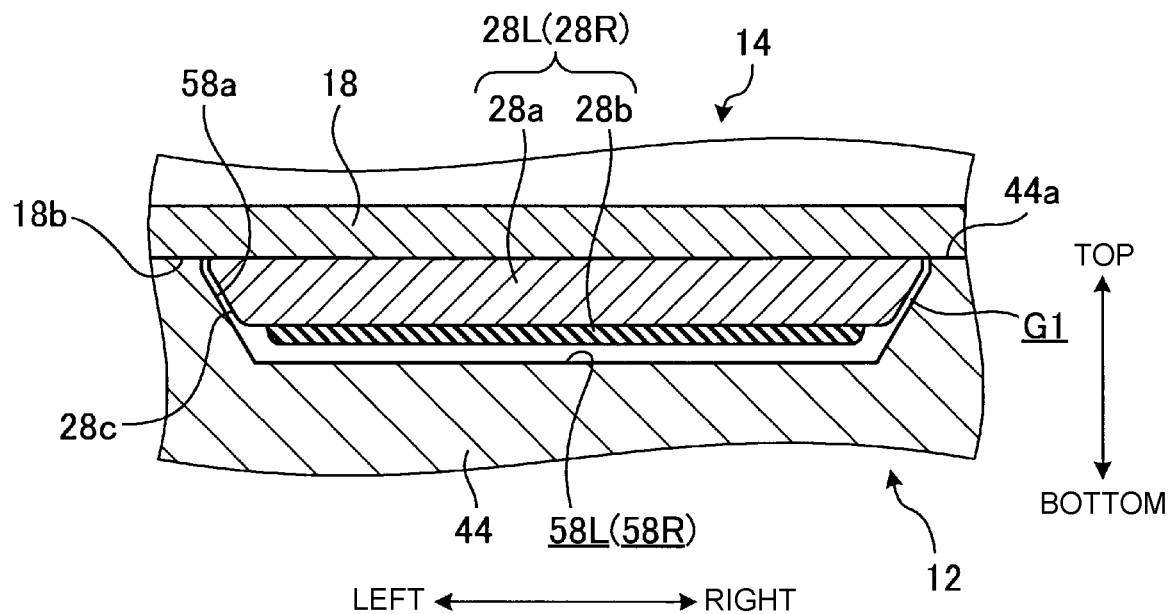
FIG. 6B is a sectional side view of the leg portion and the fitting hole in a fitting state taken along their longitudinal directions.
Figure 7:
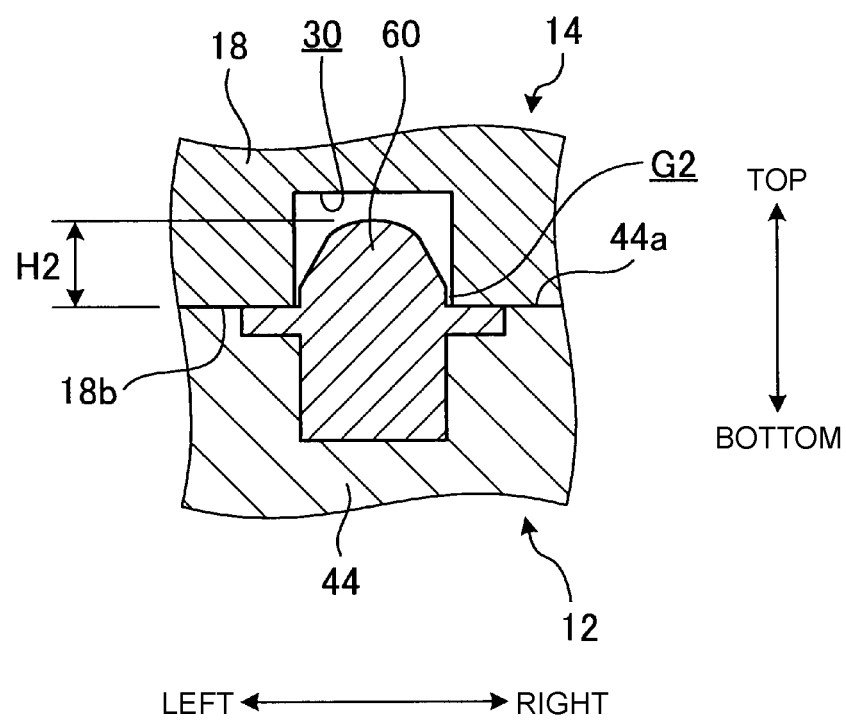
FIG. 7 is a sectional side view illustrating a fitting state of a positioning hole and a positioning pin.

The operation and structure of attaching the expansion device 12 to the portable information apparatus 14 and removing the expansion device 12 from the portable information apparatus 14 will be described below. FIG. 6A is a sectional side view of the leg portion 28L (28R) and the fitting hole 58L (58R) in a fitting state taken along their lateral directions (IVA-IVA line in FIG. 3). FIG. 6B is a sectional side view of the leg portion 28L (28R) and the fitting hole 58L (58R) in a fitting state taken along their longitudinal directions (IVB-IVB line in FIG. 3). FIG. 7 is a sectional side view illustrating a fitting state of the positioning hole 30 and the positioning pin 60.

When attaching the expansion device 12 to the portable information apparatus 14, the top surface 44a of the expansion device 12 is brought closer to the attachment position on the rear end side of the bottom surface 18b of the portable information apparatus 14, and the leg portions 28L and 28R are fitted into the fitting holes 58L and 58R. As illustrated in FIGS. 6A and 6B, the outer peripheral side surface of each of the leg portions 28L and 28R forms an outer peripheral tapered surface 28c that gradually decreases in diameter in the projection direction. Likewise, the inner peripheral side surface of each of the fitting holes 58L and 58R forms an inner peripheral tapered surface 58a that gradually decreases in diameter in the recess direction. Accordingly, the leg portions 28L and 28R are each led to the inner peripheral tapered surface 58a of a corresponding one of the fitting holes 58L and 58R through its outer peripheral tapered surface 28c, so that the leg portions 28L and 28R and the fitting holes 58L and 58R can be fitted together easily.

In the electronic apparatus 10, the projection height H1 of the leg portions 28L and 28R from the bottom surface 18b (see FIG. 6A) is higher than the projection height H2 of the positioning pin 60 from the top surface 44a (see FIG. 7). Accordingly, after at least part of each of the leg portions 28L and 28R is inserted into a corresponding one of the fitting holes 58L and 58R, the positioning pin 60 is fitted into the positioning hole 30 as illustrated in FIG. 7.

In this embodiment, the fitting tolerance between the leg portions 28L and 28R and the fitting holes 58L and 58R (e.g., 0.5 mm) is set to be larger than the fitting tolerance between the positioning pin 60 and the positioning hole 30 (e.g., 0.05 mm). That is, the gap G1 formed between the leg portions 28L and 28R and the fitting holes 58L and 58R is larger than the gap G2 formed between the positioning pin 60 and the positioning hole 30. Hence, after a certain degree of positioning is made by the leg portions 28L and 28R and the fitting holes 58L and 58R, the positioning pin 60 is fitted into the positioning hole 30. This enables smooth fitting of the positioning pin 60 and the positioning hole 30 having a strict fitting tolerance, and achieves more accurate positioning action after the fitting is completed.

Moreover, in the electronic apparatus 10, the projection height H1 of the leg portions 28L and 28R is higher than the projection height H2 of the positioning pin 60 from the top surface 44a. Thus, even when the top surface (contact portion 28b) of each of the leg portions 28L and 28R comes into contact with the top surface 44a when attaching the expansion device 12 to the portable information apparatus 14, the top of the positioning pin 60 does not come into contact with the bottom surface 18b. Consequently, the positioning pin 60 which is a metal pin can be prevented from damaging the bottom surface 18b of the portable information apparatus 14. Meanwhile, at least the contact portion 28b of each of the leg portions 28L and 28R at the surface is made of a rubber material softer than the material of the positioning pin 60, and therefore the leg portions 28L and 28R can be prevented from damaging the top surface 44a of the expansion device 12.

With the fitting of the leg portions 28L and 28R into the fitting holes 58L and 58R and the fitting of the positioning pin 60 into the positioning hole 30, the magnets 42aN to 42cN and 43aS to 43cS of the expansion device 12 attract the magnets 36aS to 36cS and 37aN to 37cN of the portable information apparatus 14. Thus, the expansion device 12 is attached to the bottom surface 18b of the portable information apparatus 14 at the predetermined position, so that the spring pins 41 are connected to the terminal plate 34 and the connection portion 40 is connected to the connected portion 32. This completes the attachment of the expansion device 12 to the bottom surface 18b of the portable information apparatus 14. Hence, sound output from the portable information apparatus 14 can be reproduced by the speakers 16L and 16R.

Here, the expansion device 12 is attached so that the rear surface 44c is located at a position of a certain degree of forward offset from the rear surface 18c on the rear end side of the bottom surface 18b, as illustrated in FIGS. 2B and 3. Therefore, in the electronic apparatus 10, the display chassis 20 can be smoothly opened and closed without the hinge 22 with a drop-down structure and the display chassis 20 interfering with the expansion device 12.

As described above, the expansion device 12 includes: the device chassis 44 having a shorter front-rear dimension than the front-rear dimension of the apparatus chassis 18 of the portable information apparatus 14; the speakers 16L and 16R provided to face the front surface 44d of the device chassis 44; and the positioning attachment portion 66 provided at the top surface 44a of the device chassis 44, and positioned with respect to and removably attached to the bottom surface 18b of the apparatus chassis 18.

The expansion device 12, as a result of being attached to the bottom surface 18b of the apparatus chassis 18 of the portable information apparatus 14, can reproduce sound output from the portable information apparatus 14 by the speakers 16L and 16R provided at its front surface. For example, sound quality or range not allowed to the speakers 25L and 25R mounted in the portable information apparatus 14 can be reproduced by the speakers 16L and 16R, thus expanding the speaker function of the portable information apparatus 14. It is also possible to, for example, reproduce high range by the speakers 25L and 25R and low range by the speakers 16L and 16R.

Since the device chassis 44 has a shorter front-rear dimension than the front-rear dimension of the apparatus chassis 18, in a state in which the device chassis 44 is attached to the bottom surface 18b of the apparatus chassis 18, the space S through which sound reproduced by the speakers 16L and 16R passes favorably can be secured in front of the front surface 44d of the device chassis 44 (see FIG. 2B). That is, the expansion device 12 has the device chassis 44 shorter than the apparatus chassis 18 and has the speakers 16L and 16R at its front surface 44d, and thus can deliver favorable sound to the user operating the electronic apparatus 10 despite its structure of being attached to the bottom surface 18b of the portable information apparatus 14. In addition, in the expansion device 12, the left speaker 16L faces left and the right speaker 16R faces right, so that more favorable sound can be delivered to the user.

The expansion device 12 includes the fitting holes 58L and 58R and the magnets 42aN to 42cN and 43aS to 43cS, as the positioning attachment portion 66 with respect to the portable information apparatus 14. Thus, the leg portions 28L and 28R protruding from the bottom surface 18b of the portable information apparatus 14 can be effectively used for positioning. Moreover, it suffices to provide, in the apparatus chassis 18 of the portable information apparatus 14, at least the magnets 36aS to 36cS and 37aN to 37cN that attract the magnets 42aN to 42cN and 43aS to 43cS. This is easy even when the apparatus chassis 18 is thin. In addition, since the expansion device 12 does not have a hook-like member protruding from the top surface 44a, the top surface 44a of the device chassis 44 is substantially flat, which contributes to high designability. The magnets 36aS to 36cS and 37aN to 37cN which are attracted bodies for the magnets 42aN to 42cN and 43aS to 43cS of the expansion device 12 may be replaced with iron plates or the like. Instead of or together with the magnet 42aN, etc. and the magnet 36aS, etc., a hook-like engagement means may be used to connect the expansion device 12 and the portable information apparatus 14.

Moreover, fitting the leg portions 28L and 28R into the fitting holes 58L and 58R produces not only the above-described effect of positioning the expansion device 12 and effect of preventing rotation of the expansion device 12 but also the effect of preventing displacement of the expansion device 12 from a direction parallel to the bottom surface 18b of the portable information apparatus 14 and therefore the effect of preventing detachment of the magnet 42aN, etc. and the magnet 36aS, etc. In detail, since a magnet is weak against a force in a direction perpendicular to an attraction force, the attraction state between the magnet 42aN, etc. and the magnet 36aS, etc. can be maintained more reliably by preventing misalignment in a direction parallel to the bottom surface 18b of the expansion device 12 by the fitting holes 58L and 58R.

The positioning pin 60 is nearer the connection portion 40 than the fitting holes 58L and 58R. By locating the positioning pin 60 with a considerably smaller fitting tolerance than the fitting holes 58L and 58R near the connection portion 40, positioning between the optical communication modules 32a and 40a which require highly accurate positioning can be performed by the positioning pin 60 with high accuracy.

Figure 8:
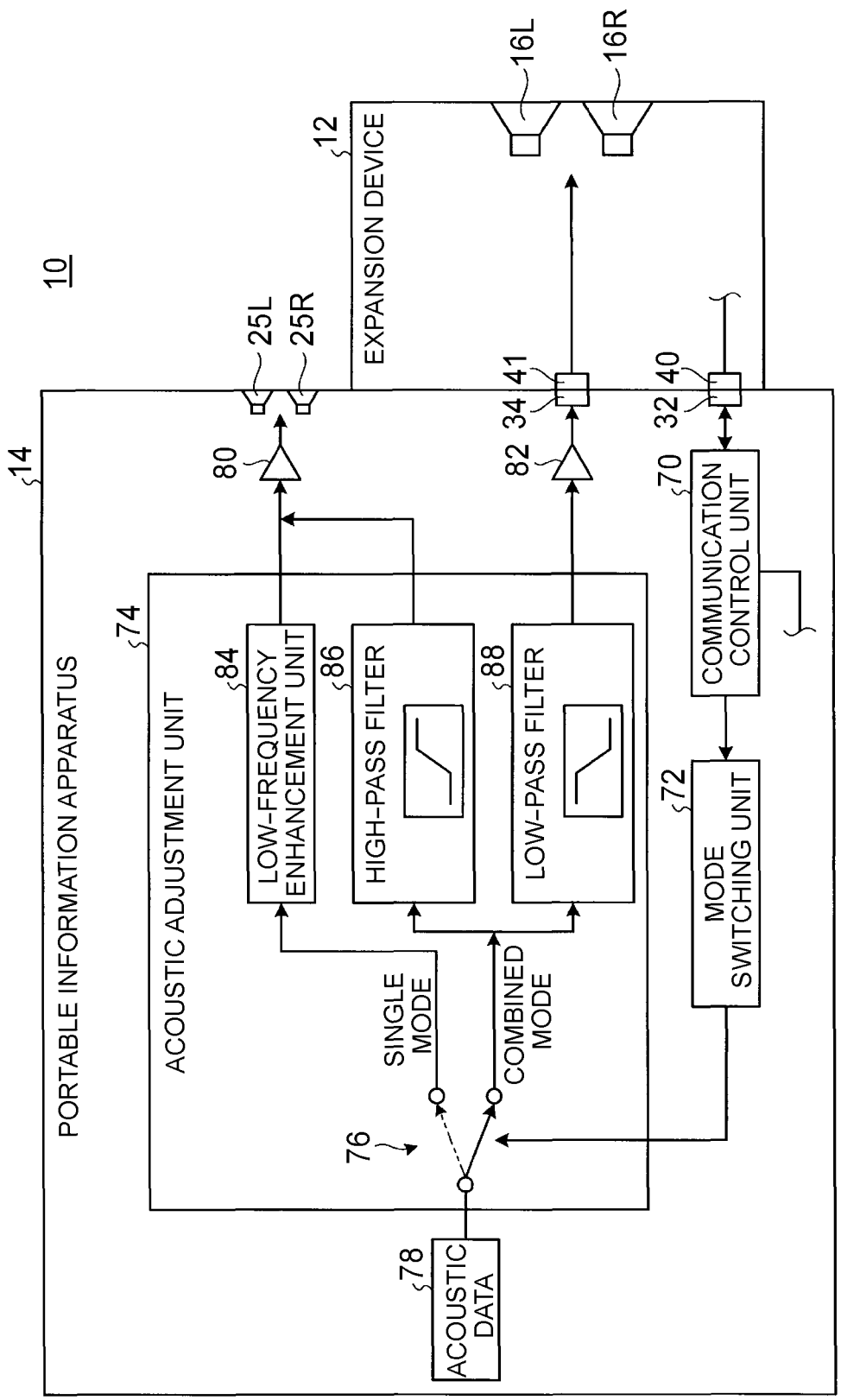
FIG. 8 is a block diagram relating to acoustic output in the electronic apparatus, according to one embodiment.

FIG. 8 is a block diagram relating to acoustic output in the electronic apparatus 10. In the portable information apparatus 14, acoustic data is in stereoscopic format with signals of two lines of left and right. In FIG. 8, however, signals of two lines are represented as one line, for convenience's sake.

As illustrated in FIG. 8, the portable information apparatus 14 includes a communication control unit 70, a mode switching unit 72, and an acoustic adjustment unit 74. The communication control unit 70, the mode switching unit 72, and the acoustic adjustment unit 74 are implemented, for example, by a processor such as a Central Processing Unit (CPU) executing a program, i.e., by software. Alternatively, these components may be implemented by hardware such as an integrated circuit (IC), or implemented by software and hardware in combination.

The communication control unit 70 is a part that communicates with the expansion device 12 through the connected portion 32 and the connection portion 40. The communication control unit 70 can detect that the expansion device 12 is attached to the portable information apparatus 14 once the communication between the connection portion 40 and the connected portion 32 has been established, and thus also serves as an attachment detection means for the expansion device 12. The communication control unit 70 notifies the portable information apparatus 14 whether the expansion device 12 is attached or removed. The means of detecting the attachment of the expansion device 12 is not limited to this. For example, a magnetic sensor (e.g., Hall sensor) may be implemented on a substrate in the portable information apparatus 14, to detect the approach of the magnets of the expansion device 12 by the magnetic sensor when the expansion device 12 is attached. The mode switching unit 72 then reads the signal of the magnetic sensor, to detect whether the expansion device 12 is attached.

The mode switching unit 72 is a part that sets a mode relating to whether the speakers 16L and 16R and the internal speakers 25L and 25R are driven. When the expansion device 12 is removed from the portable information apparatus 14, the mode switching unit 72 instructs the acoustic adjustment unit 74 to drive the internal speakers 25L and 25R in the single mode. When the expansion device 12 is attached to the portable information apparatus 14, the mode switching unit 72 instructs the acoustic adjustment unit 74 to drive the speakers 16L and 16R and the internal speakers 25L and 25R in the combined mode. FIG. 8 illustrates this switching process by a schematic switch 76. Mode switching by the mode switching unit 72 is not limited to automatic switching, and may be performed based on user operation.

The acoustic adjustment unit 74 is a part that adjusts acoustic data 78 output to the internal speakers 25L and 25R and the speakers 16L and 16R. The adjustment method differs between the single mode and the combined mode. The acoustic data 78 may be data stored in a predetermined storage unit, or supplied from a communication line in real time. The acoustic data 78 may be data composed of only voice and acoustic, or be combined with an image. The data format (e.g., compression format) of the acoustic data 78 is not limited. Depending on the data format, predetermined code conversion is performed before use.

Output data from the acoustic adjustment unit 74 is output to the internal speakers 25L and 25R through an output unit 80, and output to the speakers 16L and 16R through an output unit 82. The output units 80 and 82 are digital-analog converters or amplifiers, and drive the internal speakers 25L and 25R and the speakers 16L and 16R. The amplifier may be any of an analog amplifier and a digital amplifier.

The acoustic adjustment unit 74 includes: a low-frequency enhancement unit 84 that enhances the low frequency portion from the acoustic data 78; a high-pass filter 86 that extracts only the high frequency portion from the acoustic data 78; and a low-pass filter 88 that extracts only the low frequency portion from the acoustic data 78. The low-frequency enhancement unit 84 is set according to the characteristics of the internal speakers 25L and 25R. The high-pass filter 86 and the low-pass filter 88 are set according to the characteristics of the internal speakers 25L and 25R and the speakers 16L and 16R. Crossover frequency is set so that the frequency characteristics are flat when the high-pass filter 86 and the low-pass filter 88 are combined.

When the mode switching unit 72 selects the single mode, the acoustic adjustment unit 74 outputs the acoustic data 78 to the internal speakers 25L and 25R through the output unit 80, and does not output the acoustic data 78 to the speakers 16L and 16R. Thus, in the single mode, only the internal speakers 25L and 25R are driven, without driving the speakers 16L and 16R. In the single mode, the acoustic adjustment unit 74 passes the acoustic data 78 through the low-frequency enhancement unit 84 and then outputs it to the internal speakers 25L and 25R. Consequently, in the single mode, the low frequency sound of the acoustic data 78 is enhanced as compared with the case where the combined mode is selected. While the low frequency sound output characteristics of the internal speakers 25L and 25R may be insufficient due to size constraint, low frequency sound is compensated for by outputting the acoustic data 78 through the low-frequency enhancement unit 84, as a result of which suitable sound is obtained.

When the mode switching unit 72 selects the combined mode, the acoustic adjustment unit 74 outputs the acoustic data 78 to the internal speakers 25L and 25R through the output unit 80, and outputs the acoustic data 78 to the speakers 16L and 16R through the output unit 82. Thus, the internal speakers 25L and 25R and the speakers 16L and 16R are driven in the combined mode. In the combined mode, the acoustic adjustment unit 74 passes the acoustic data 78 through the high-pass filter 86 and then outputs it to the internal speakers 25L and 25R, to cut off low frequency sound and extract and output only high frequency sound. In the combined mode, the acoustic adjustment unit 74 passes the acoustic data 78 through the low-pass filter 88 and then outputs it to the speakers 16L and 16R, to cut off high frequency sound and extract and output only low frequency sound.

Thus, the internal speakers 25L and 25R are in charge of high frequency sound, and the speakers 16L and 16R are in charge of low frequency sound. Conceptually, the internal speakers 25L and 25R function as a tweeter, and the speakers 16L and 16R function as a woofer.

The expansion device 12 is located under the bottom surface 18b of the apparatus chassis 18 of the portable information apparatus 14 (see FIG. 2B). The space S through which sound from the speakers 16L and 16R pass is secured in front of the expansion device 12, but high frequency sound with high directivity is shielded or reflected by the bottom surface 18b to some extent. In the electronic apparatus 10 according to this embodiment, only low frequency sound with low directivity is output from the speakers 16L and 16R, which is transferred to the surroundings without being affected by the bottom surface 18b. Meanwhile, the internal speakers 25L and 25R output only high frequency sound with high directivity, and are located at an appropriate position that allows the user to hear sound easily. Therefore, the user can appropriately hear low frequency sound and high frequency sound. Since the internal speakers 25L and 25R do not output low frequency sound for which output characteristics are insufficient, the internal speakers 25L and 25R are dedicated to high frequency and thus achieve high sound quality. The speakers 16L and 16R do not output high frequency sound, so that unnatural acoustic echo resulting from high frequency sound reflecting off the bottom surface 18b can be prevented. Moreover, the internal speakers 25L and 25R are used effectively even in a state in which the expansion device 12 is attached.

Virtual surround function is available in recent personal computers. The virtual surround function can improve stereoscopic effect and increase a sense of realism for movies, games, etc., with small size. The effect of high frequency sound is particularly high, whereas the effect of low frequency sound is relatively low. In the electronic apparatus 10 according to this embodiment, the internal speakers 25L and 25R are in charge of output of high frequency sound. Since there is no obstacle between the internal speakers 25L and 25R and the user, virtual surround function can be appropriately achieved. Meanwhile, output of powerful low frequency sound is desired in movies, games, etc. Such low frequency sound is appropriately output from the speakers 16L and 16R of large size.

Figure 9A:
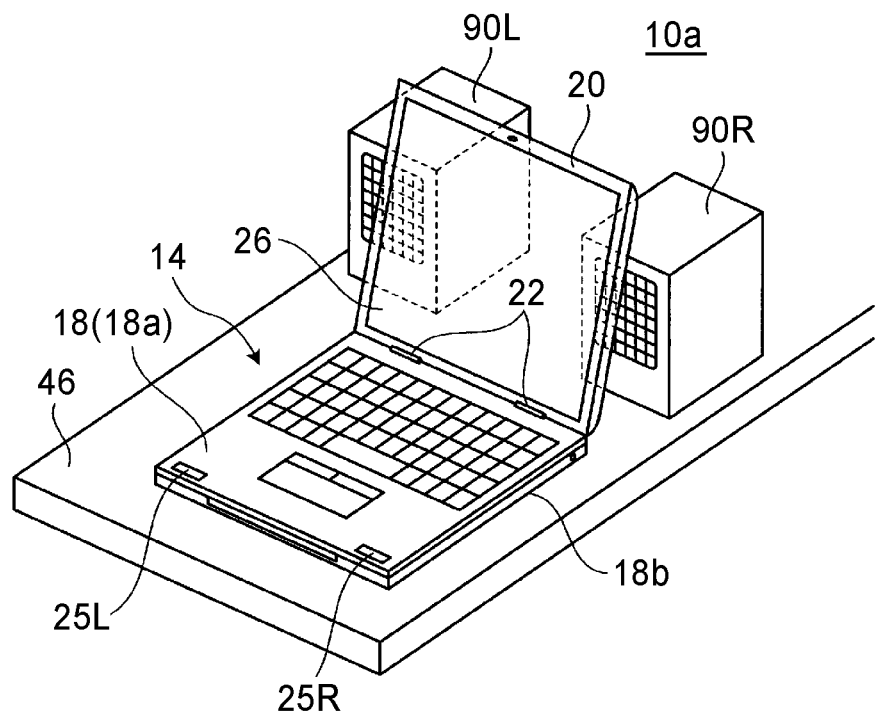
FIG. 9A is a perspective view illustrating an electronic apparatus according to a modification in which an external speaker is located on the rear side of the display chassis.
Figure 9B:
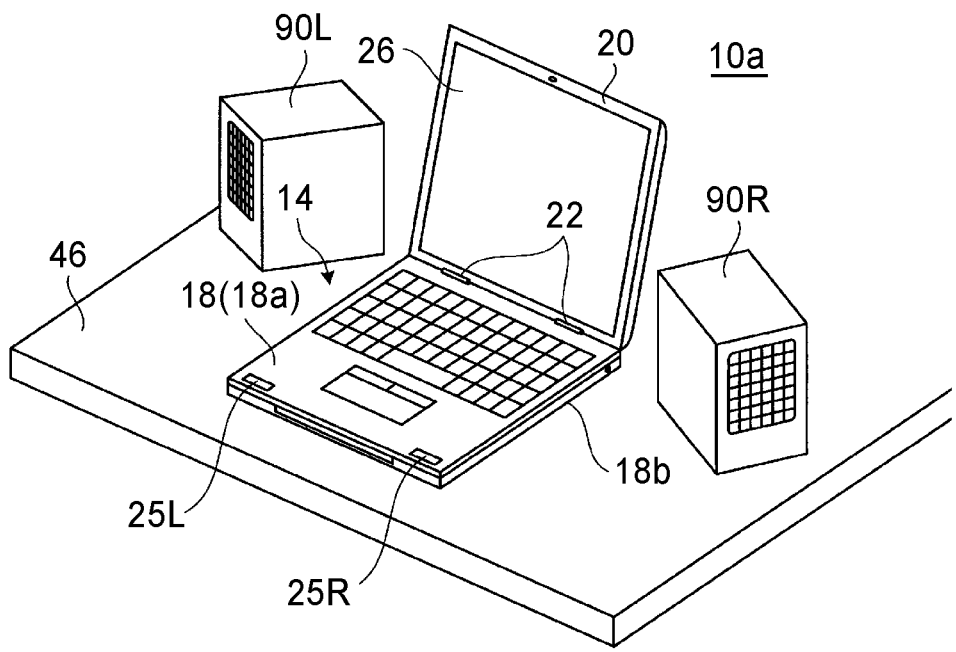
FIG. 9B is a perspective view illustrating an electronic apparatus according to a modification in which the external speaker is in a slanting direction.

FIGS. 9A and 9B are each a perspective view illustrating an electronic apparatus 10a according to a modification. As illustrated in FIG. 9A, a pair of left and right external speakers (expansion device, second speaker) 90L and 90R are used in the electronic apparatus 10a. The external speakers 90L and 90R are connected to the portable information apparatus 14 instead of the expansion device 12, and have a size greater than or equal to the size of the speakers 16L and 16R and have excellent output characteristics of low frequency sound. The portable information apparatus 14 and the external speakers 90L and 90R may be connected to each other via wires or wirelessly. A digital-analog converter may be interposed between the portable information apparatus 14 and the external speakers 90L and 90R.

In the electronic apparatus 10a, when such external speakers 90L and 90R are used, too, the internal speakers 25L and 25R are in charge of high frequency sound and the external speakers 90L and 90R are in charge of low frequency sound. This is effective, for example, under constraints that the external speakers 90L and 90R need to be located on the rear side of the display chassis 20 because a use surface 46 is small, as illustrated in FIG. 9A. That is, the external speakers 90L and 90R output low frequency sound with low directivity. The sound is unlikely to be affected by the display chassis 20, and therefore is transmitted to the surroundings. Meanwhile, the internal speakers 25L and 25R are in charge of high frequency sound. Since there is no obstacle, the sound is appropriately transmitted to the user.

As illustrated in FIG. 9B, when the external speakers 90L and 90R are not in an appropriate direction (e.g., are in a slanting outward direction) and do not properly face the user, even when high frequency sound is output from the external speakers 90L and 90R, the sound is not appropriately transmitted to the user due to its directivity. In the electronic apparatus 10a, on the other hand, high frequency sound is output not from the external speakers 90L and 90R but from the internal speakers 25L and 25R, and therefore is appropriately transmitted to the user. Hence, the user does not need to be overly concerned about the settings of the external speakers 90L and 90R.

As described above, the electronic apparatus 10 (10a) according to this embodiment includes the portable information apparatus 14 including the internal speakers 25L and 25R, and the expansion device 12 including the speakers 16L and 16R or the external speakers 90L and 90R. In the single mode, the acoustic adjustment unit 74 outputs the acoustic data 78 to the internal speakers 25L and 25R. In the combined mode, the acoustic adjustment unit 74 extracts high frequency sound from the acoustic data 78 and outputs the high frequency sound to the internal speakers 25L and 25R, and extracts low frequency sound from the acoustic data 78 and outputs the low frequency sound to the speakers 16L and 16R or the external speakers 90L and 90R. Thus, high frequency sound with high directivity is output from the internal speakers 25L and 25R and low frequency sound with low directivity is output from the speakers 16L and 16R or the external speakers 90L and 90R, so that the sound can be appropriately transmitted to the user regardless of the placement constraint and setting. Moreover, since the speakers 16L and 16R and the external speakers 90L and 90R do not have size constraint like the internal speakers 25L and 25R, high sound quality can be achieved. Therefore, low frequency sound to high frequency sound can be appropriately output to enable acoustic reproduction with high sound quality.

As has been described, the present invention provide an electronic apparatus that appropriately outputs low frequency sound to high frequency sound to enable acoustic reproduction with high sound quality.

While the invention has been particularly shown and described with reference to a preferred embodiment, it will be understood by those skilled in the art that various changes in form and detail may be made therein without departing from the spirit and scope of the invention.

What is claimed is:

1. An expansion device, comprising:
    a device chassis; and
    a second speaker contained within said device chassis to be removably attached to a portable information apparatus having a first speaker, wherein said portable information apparatus includes:
        a mode switching unit for selecting one of a single mode and a combined mode; and
        an acoustic adjustment unit for adjusting acoustic data output to said first speaker and said second speaker, in response to whether said single mode or said combined mode is being selected by said mode switching unit, wherein when said single mode is selected, said acoustic adjustment unit outputs acoustic data to said first speaker, and when said combined mode is selected, said acoustic adjustment unit extracts high-frequency sound from said acoustic data and outputs said high-frequency sound to said first speaker, and extracts low-frequency sound from said acoustic data and outputs said low-frequency sound to said second speaker.

2. The expansion device of claim 1, wherein said second speaker is positioned on a rear end side of a bottom surface of said portable information apparatus.

3. The expansion device of claim 2, wherein a bottom surface of said expansion device and a front end of said bottom surface of said portable information apparatus form a land surface to a placement surface of an electronic apparatus.

4. The expansion device of claim 1, wherein said mode switching unit selects said single mode when said portable information apparatus is not attached to said expansion device, and selects said combined mode when said portable information apparatus is attached to said expansion device.

5. The expansion device of claim 1, wherein said acoustic adjustment unit enhances said low-frequency sound of said acoustic data when said single mode is selected.

6. The expansion device of claim 1, wherein said portable information apparatus includes a keyboard and a display.

7. The expansion device of claim 1, wherein said device chassis includes a shorter front-rear dimension than a front-rear dimension of an apparatus chassis of said portable information apparatus.

8. The expansion device of claim 1, wherein said second speaker faces a front surface of said device chassis.

9. The expansion device of claim 1, wherein said device chassis includes a positioning attachment portion at a top surface of said device chassis, and is positioned with respect to and removably attached to a bottom surface of an apparatus chassis of said portable information apparatus.

10. The expansion device of claim 9, wherein said positioning attachment portion includes:
    a plurality of magnets facing said top surface of said device chassis for attracting a plurality of attracted bodies facing said bottom surface of said apparatus chassis, and
    a fitting hole provided at said top surface of said device chassis and into which a leg portion protruding from said bottom surface of said apparatus chassis is fittable.

11. The expansion device of claim 10, wherein said positioning attachment portion further includes a positioning projection provided at said top surface of said device chassis and fittable into a positioning hole provided at said bottom surface of said apparatus chassis.

12. The expansion device of claim 11, wherein at said top surface of said device chassis is provided a connection portion electrically connectable to a connected portion provided at said bottom surface of said apparatus chassis in at least one of a non-contact type connection mode and a contact type connection mode, said positioning projection being located nearer said connection portion than said fitting hole.

13. The expansion device of claim 1, wherein said second speaker includes a pair of left and right speakers provided inside said device chassis.

14. The expansion device of claim 13, wherein said left speaker is installed at said front surface of said device chassis in a direction inclined to left from front, wherein said right speaker device is installed at said front surface of said device chassis in a direction inclined to right from front.

15. The expansion device of claim 1, wherein said device chassis includes a front-part-low inclined shape in which a thickness between said top surface and a bottom surface thereof gradually decreases in a direction from a rear surface to said front surface.

16. The expansion device of claim 1, wherein a connection terminal for connecting an external apparatus is provided at a rear surface of said device chassis.

\* \* \* \* \*